(12) United States Patent
Chiu et al.

(10) Patent No.: US 10,901,173 B2
(45) Date of Patent: Jan. 26, 2021

(54) CAMERA MODULE AUTOFOCUS ACTUATOR

(71) Applicant: ACTUATOR SOLUTIONS GMBH, Gunzenhausen (DE)

(72) Inventors: Chi-Wei Chiu, Taoyuan (TW); Hung-Chia Lu, Taoyuan (TW); Huang-Wei Hsu, Taoyuan (TW)

(73) Assignee: ACTUATOR SOLUTIONS GMBH, Gunzenhausen (DE)

( * ) Notice: Subject to any disclaimer, the term of this patent is extended or adjusted under 35 U.S.C. 154(b) by 0 days.

(21) Appl. No.: 16/606,528

(22) PCT Filed: Jul. 4, 2018

(86) PCT No.: PCT/IB2018/054935
§ 371 (c)(1),
(2) Date: Oct. 18, 2019

(87) PCT Pub. No.: WO2019/008522
PCT Pub. Date: Jan. 10, 2019

(65) Prior Publication Data
US 2020/0393638 A1 Dec. 17, 2020

Related U.S. Application Data

(60) Provisional application No. 62/528,822, filed on Jul. 5, 2017.

(30) Foreign Application Priority Data

Jul. 4, 2017 (IT) .................. 102017000074728

(51) Int. Cl.
*G02B 7/02* (2006.01)
*G02B 7/09* (2006.01)
*G03B 13/36* (2006.01)

(52) U.S. Cl.
CPC ............. *G02B 7/09* (2013.01); *G03B 13/36* (2013.01)

(58) Field of Classification Search
CPC .......... G02B 7/102; G02B 7/09; G02B 7/026; G02B 7/005; G02B 7/04; G02B 7/021;
(Continued)

(56) References Cited

U.S. PATENT DOCUMENTS

2011/0091193 A1    4/2011 Lim et al.
2011/0103784 A1    5/2011 Hashizume et al.
(Continued)

FOREIGN PATENT DOCUMENTS

JP      2014-10380 A      1/2014
WO    WO 2008/099156 A2   8/2008
(Continued)

OTHER PUBLICATIONS

International Search Report issued in PCT/IB2018/054935 (PCT/ISA/210), dated Sep. 19, 2018.
(Continued)

*Primary Examiner* — William R Alexander
*Assistant Examiner* — Tamara Y. Washington
(74) *Attorney, Agent, or Firm* — Birch, Stewart, Kolasch & Birch, LLP

(57) ABSTRACT

Autofocus actuator for camera modules comprising a SMA wire (17) as actuating element and at least six spheres (27) as sliding aids contained in at least three slots (26) formed in a lens carrier (12) and symmetrically arranged around a guide pin (15) mounted on a bottom plate (13), whereby the guide pin (15), slots (26) and spheres (27) form a linear bearing for the sliding axial movement of the lens carrier (12) on the bottom plate (13), whereby two sets of additional spheres, each set comprising at least two spheres, are kept in position by a sphere stopping structure.

21 Claims, 7 Drawing Sheets

(58) Field of Classification Search
CPC .......... G02B 7/028; G02B 7/008; G02B 7/02;
G02B 7/38; G02B 7/00; G02B 7/004;
G02B 7/182; G02B 7/1827; G02B 7/22;
G02B 7/282; G02B 7/14; G02B 7/10;
G02B 7/1822; G02B 7/022; G02B 7/185;
G02B 7/003; G02B 1/041; G02B 27/017;
G02B 27/102; G02B 6/3604; G02B
23/2423; G02B 23/16; G02B 6/3578
USPC .......................................................... 359/824
See application file for complete search history.

(56) References Cited

U.S. PATENT DOCUMENTS

| | | | | |
|---|---|---|---|---|
| 2011/0122517 | A1* | 5/2011 | Ko | G03B 3/10 |
| | | | | 359/824 |
| 2013/0162896 | A1* | 6/2013 | Kang | G03B 5/00 |
| | | | | 348/374 |
| 2017/0108705 | A1* | 4/2017 | Yu | H04N 5/23258 |
| 2017/0299945 | A1* | 10/2017 | Suzuki | F03G 7/065 |

FOREIGN PATENT DOCUMENTS

| | | |
|---|---|---|
| WO | WO 2011/122438 A1 | 10/2011 |
| WO | WO 2016/075606 A1 | 5/2016 |
| WO | WO 2017/105010 A1 | 6/2017 |

OTHER PUBLICATIONS

Written Opinion of the International Searching Authority issued in PCT/IB2018/054935 (PCT/ISA/237), dated Sep. 19, 2018.

* cited by examiner

CAMERA MODULE AUTOFOCUS ACTUATOR

The present invention is inherent to an autofocus (AF) actuator for camera modules incorporating a shape memory alloy (SMA) wire as actuating element, with particular reference to cellular phones camera modules.

Generally speaking the use of SMA wires as actuating elements provides various advantages with respect to other actuating systems in terms of weight, power consumption, costs.

These advantages have already been recognized also in the field of camera modules and have been the subject of various patent applications, such as international patent applications WO 2007/113478, WO 2011/122438, WO 2016/075606 and U.S. Pat. No. 8,159,762 all describing camera modules with a SMA wire in contact with the lens carrier and fixed to the camera module housing. The controlled heating via Joule effect of the SMA wire causes its contraction and the movement of the lens carrier with respect to the housing, while a return elastic element causes the lens carrier to move back to its rest position when the SMA wire is deactivated.

The first two above-referenced international patent applications do not address the frictional phenomena between housing and lens carrier and the related problems in terms of actuator lifetime, while this aspect is instead tagged in WO 2016/075606 and U.S. Pat. No. 8,159,762 by means of rolling members interposed between the housing and the lens carrier and contained in guide channels formed in said elements. Even though this solution is an improvement in terms of frictional force management, it still has some drawbacks in terms of friction and wearing levels that in frequently used actuating systems, such as in a camera module AF, may lead to premature failures or to compensate by using upgraded components.

More specifically, the rolling members are made of metal or ceramic material whereas the guide channels are made of plastic, since they are formed in the housing and in the lens carrier, therefore the friction is not optimal and there is a wearing issue for the guide channels due to the much greater surface hardness of the rolling members. Providing a metal or ceramic coating or insert in the guide channels would solve these problems but on the other hand would result in a much more complicated manufacturing process and a significant increase in the cost of the actuator.

The object of the present invention is therefore to overcome the drawbacks still present in the known art in terms of dealing with the frictional forces in a SMA-based autofocus actuator, and in a first aspect thereof consists in a camera module autofocus actuator comprising:
- a bottom plate,
- a movable lens carrier having a protrusion with an apex for lodging a SMA wire,
- a shield can,
- a SMA wire,
- at least six spheres,
- a guide pin,
- two electric terminals at a different height with respect to the protrusion apex,
- a return elastic element,
- anti-rotation means that prevent rotation of the lens carrier around its optical axis during its movement, and in which actuator
- the lens carrier is slidably mounted between the shield can and the bottom plate,
- the two electric terminals are fixed onto the bottom plate,
- the SMA wire is in contact with the lens carrier protrusion apex and its extremities are locked to the two electric terminals on the bottom plate,
- the return elastic element is mounted between the shield can and the lens carrier and exerts a force on the latter opposing the force of the SMA wire on the lens carrier,
- the guide pin is mounted on the bottom plate with its longitudinal axis parallel to the optical axis of the lens carrier,
- the anti-rotation means are arranged between the bottom plate and the lens carrier, preferably at a position opposite to the guide pin, and include at least one sphere and/or a flexure,
- the lens carrier is provided with at least three slots each containing and holding at least two spheres, said slots being formed symmetrically around the guide pin and extending parallel thereto such that the spheres contained in the slots are always in contact with the guide pin during the operation of the actuator.

One of the most common variants for a camera module AF actuator according to the present invention envisions the presence of a (flexible) printed circuit board (FPC/PCB) that jointly with a magnet and a Hall sensor provides information about the lens carrier displacement and position. It is to be underlined that such elements are optional, since other equivalent technical solutions may be employed, such as an optical sensor or a resistance feedback of the SMA wire as described for example in WO 2008/099156.

The invention will be further illustrated with the help of the following figures, wherein.

Figure 1:
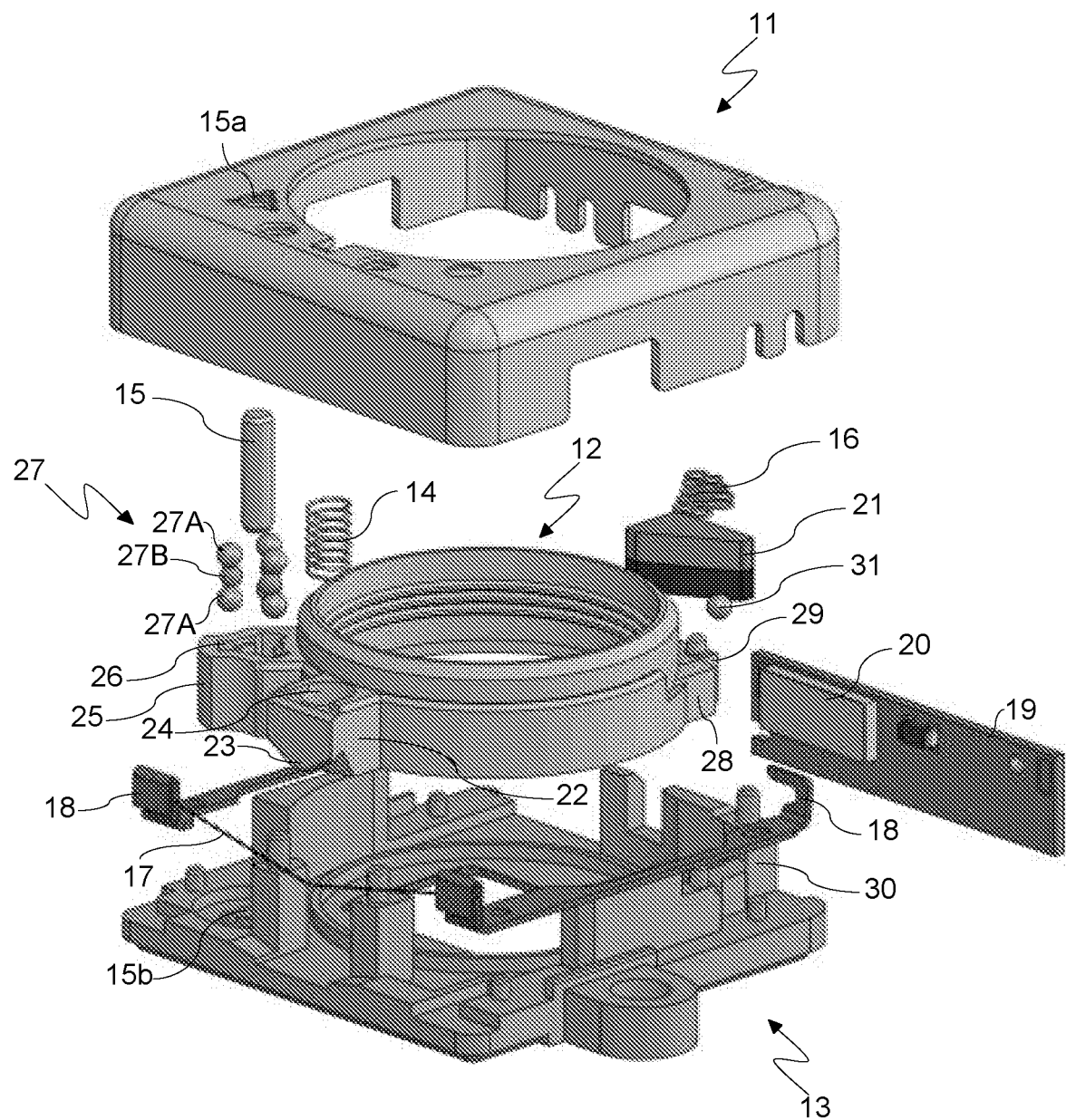
FIG. 1 is a vertically exploded top perspective view of the elements constituting an AF actuator according to the present invention.

In the above figures the dimensions and dimensional ratio of the elements may not be correct and in some cases, such as for example with regards to the SMA wire diameter, have been altered in order to enhance the drawing comprehension.

These figures show that in a preferred embodiment of an AF actuator according to the present invention its structure essentially consists of a shield can 11 that covers a movable lens carrier 12 slidably mounted on a bottom plate 13. A return spring is 14 arranged between the shield can 11 and the lens carrier 12, a guide pin 15 is mounted between the bottom plate 13 and the shield can 11 with its longitudinal axis parallel to the optical axis along which the lens carrier 12 is moved, and a flexure 16 is mounted between the lens carrier 12 and the bottom plate 13 in a plane substantially perpendicular to the optical axis.

The actuator also includes a SMA wire 17 connected to two terminals 18 which are mounted on the bottom plate 13 and are in turn connected to a printed circuit board (PCB) 19, also mounted on the bottom plate 13, which carries a Hall sensor 20 that cooperates with a magnet 21 mounted on the lens carrier 12 to detect the position of the latter.

The movable lens carrier 12 presents a frontal protrusion 22 for housing the SMA wire 17, in particular the protrusion has a lower apex 23 and the SMA wire 17 is held beneath it by the restraint action made by the two terminals 18, placed at a higher height (along the optical axis). This frontal protrusion 22 also has a top recess 24 which acts as a seat for the return spring 14, which is preferably designed with a compressed length to provide a preload force to the lens carrier 12.

The movable lens carrier 12 further presents a first corner protrusion 25 that is provided with three axial slots 26, each containing a set of three spheres 27, symmetrically arranged and centered around the guide pin 15, as well as an opposite second corner protrusion 28 in which an axial recess 29 forms with a corner 30 of the bottom plate 13 a guide channel for a single sphere 31. Note that since the lens carrier 12 has a substantially circular shape the definition "corner protrusion" refers to the fact that such a protrusion extends into a corner of the bottom plate 13, that has a substantially square shape, and ideally the distance between the guide pin 15 and the hooking position of the SMA wire 17, i.e. apex 23, should be the least possible which means that the frontal protrusion 22 and the first corner protrusion 25 should be as close as possible.

The guiding mechanism of the lens carrier 12 consists therefore in spheres 27 and pin 15 as the guiding contact, instead of the guide channels of the above-mentioned prior art actuators. In fact, both spheres 27 and pin 15 are made of metal or ceramic material and their contact provides better friction and does not create a wearing issue, when using elements of comparable surface hardness, compared to previous actuators where the contact is between metal/ceramic spheres and plastic guide channels which inevitably have a great difference in surface hardness.

Figure 6:
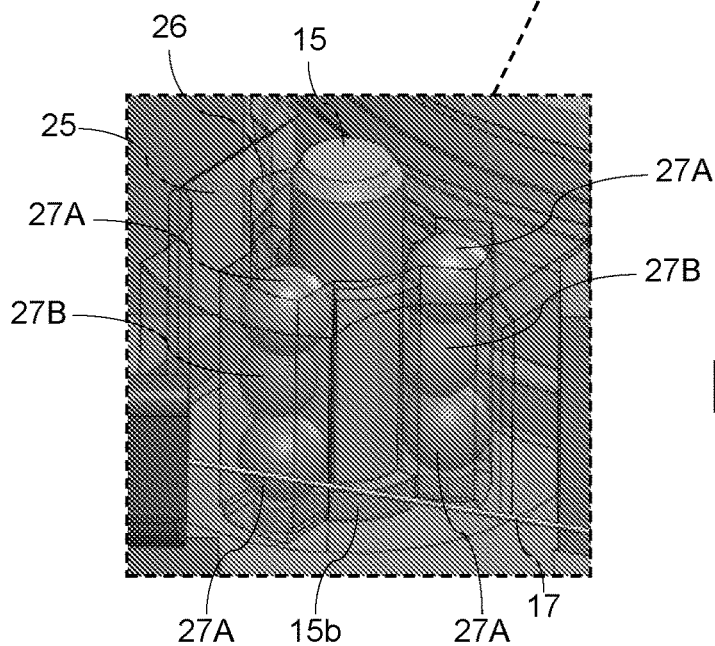
FIG. 6 is an enlarged detail of the AF actuator of FIG. 5 seen from direction A.

The three axial slots 26 contain the three sets of spheres 27 to constrain the rolling movement thereof only to a certain degree of freedom, i.e. in the direction of the optical axis that is parallel to the longitudinal axis of the guide pin 15 fixed between a top seat 15a formed in the shield can 11 and a bottom seat 15b formed in the bottom plate 13 (FIGS. 1, 6).

Figure 4:
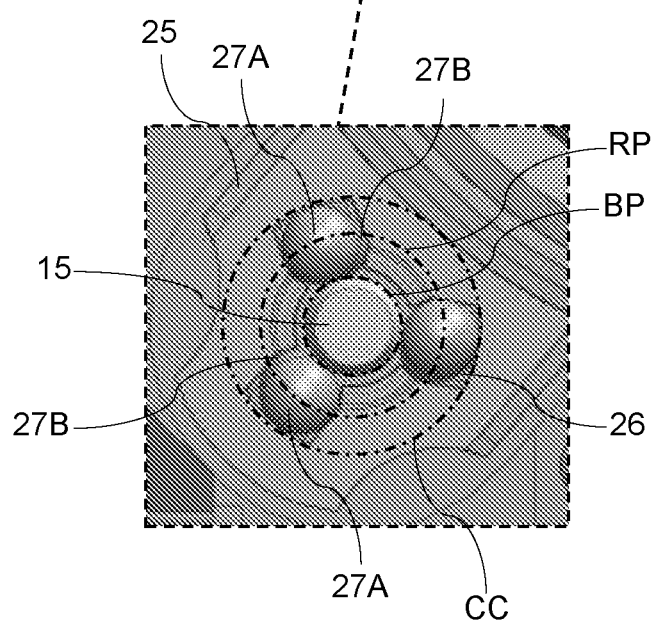
FIG. 4 is an enlarged detail of the AF actuator of FIG. 3.
Figure 5:
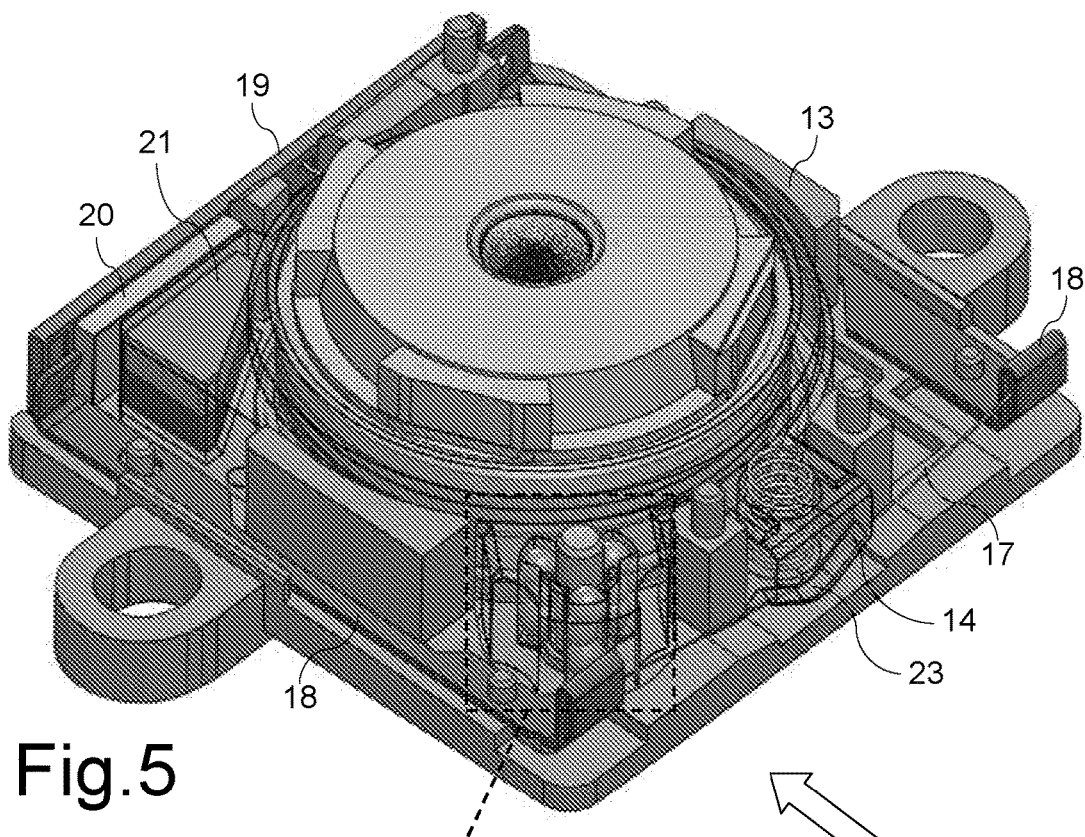
FIG. 5 is view similar to FIG. 2, without the shield can and with the lens carrier depicted in transparency.

As shown in FIG. 4, the centers of the three spheres 27 on each horizontal layer, i.e. at the same height, define a plane called "roller plane" or RP while their contact points with the surface of the guide pin 15 define a plane called "bearing plane" or BP. The tolerance gap between the RP and BP controls the dynamic tilt performance during the movement of the lens carrier 12, while the RP-BP tolerance variation among the different layers of spheres 27 dominates the static tilt performance of the actuator.

Also, the symmetrical arrangement of spheres 27 around the guide pin 15 implies a cylindrical geometry of slots 26 formed in the first corner protrusion 25 on the lens carrier 12 (see construction cylinder CC in FIG. 4). This makes possible to precisely control and fabricate the rolling surfaces of slots 26 by means of a single part, inserted on the mold for the lens carrier 12, that could be easily machined with turning process, which results in superior surface condition of slots 26 and hence contributes to a better tilt performance of the AF actuator.

More specifically, each set of spheres 27 contained in a slot 26 includes two larger spheres 27A separated by a smaller sphere 27B, with spheres 27A being the primary acting spheres that guide the movement of the lens carrier 12 and control dynamic tilt performance of the actuator, and spheres 27B being idler spheres used to keep spheres 27A spaced apart by a minimum distance equal to their diameter. The combination of guide pin 15, slots 26 and spheres 27 forms a linear bearing for the lens carrier 12, with spheres 27A that roll along the surfaces of slot 26 and guide pin 15 thus ensuring that the lens carrier 12 moves along the axial direction of the guide pin 15, i.e. along the optical axis.

The single sphere 31 is placed at a location far from the guide pin 15, namely at the opposite corner, to prevent the lens carrier 12 from rotating around the guide pin axis, whereby during the carrier's movement spheres 27 mainly control the tilt performance and the opposite corner sphere 31 is used to prevent the rotation of the lens carrier 12 relative to the bottom plate 13 which forms therewith the guide channel in which sphere 31 is contained.

Figure 2:
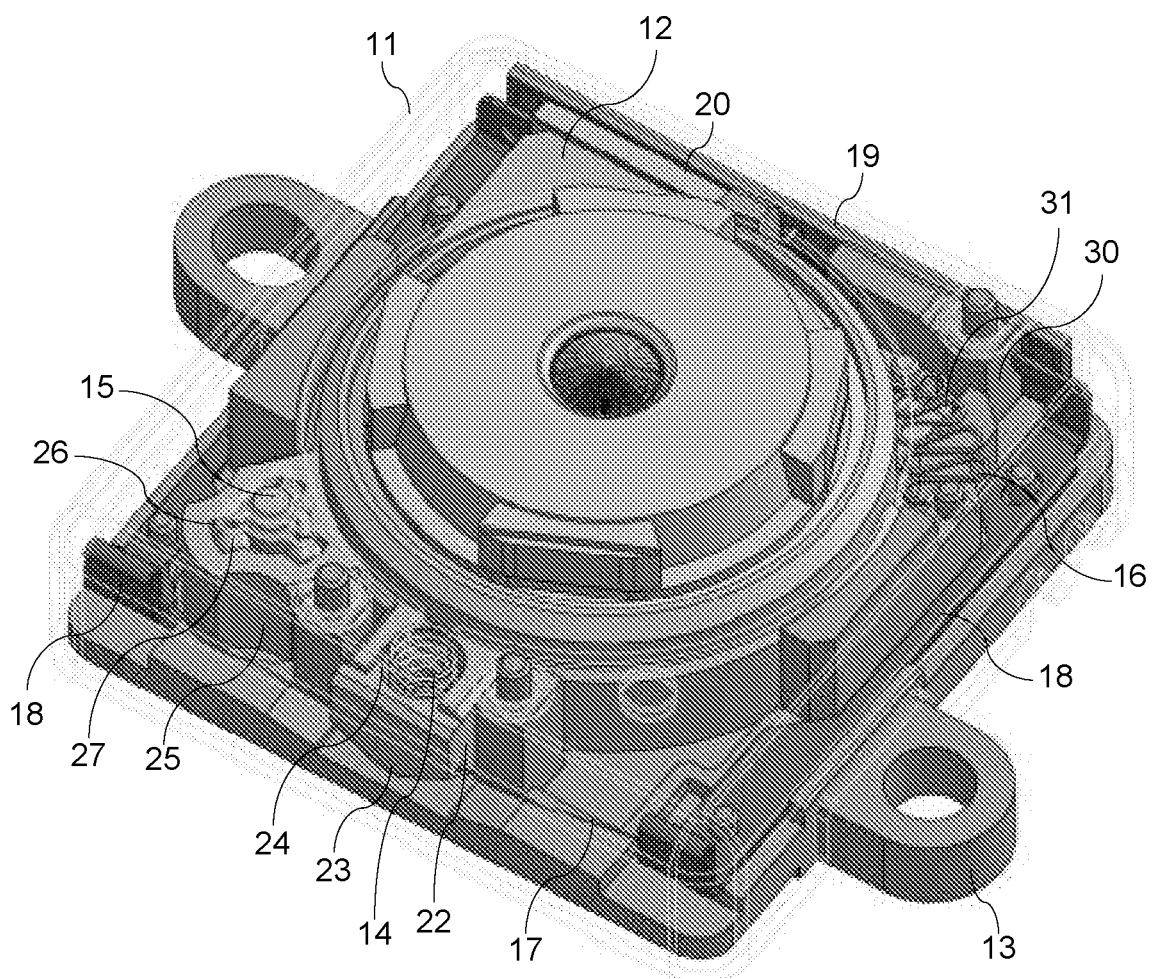
FIG. 2 is a top perspective view of the AF actuator of FIG. 1 in the assembled condition, with the addition of the lens and with the shield can depicted in transparency.
Figure 3:
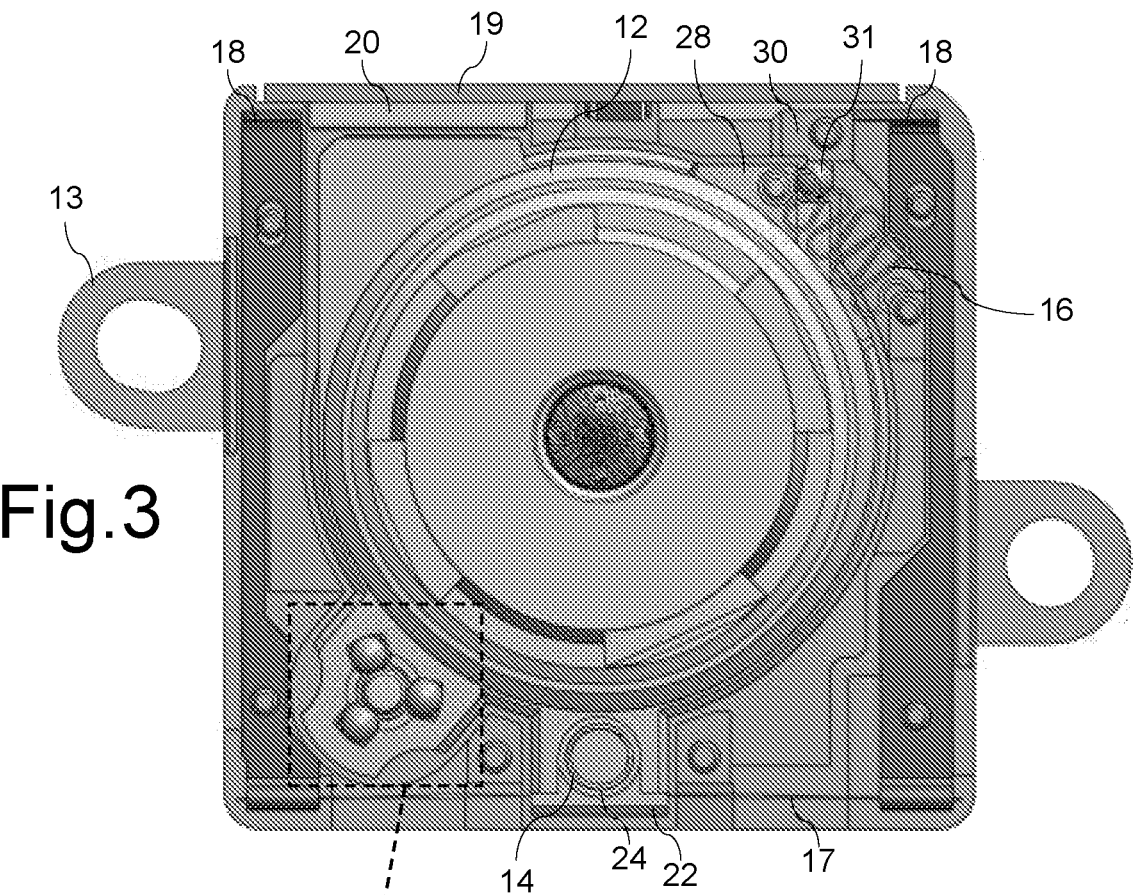
FIG. 3 is a top plan view of the AF actuator of FIG. 2 without the shield can.

This anti-rotation function is carried out also by flexure 16, that is used to provide the alignment of the lens carrier 12 by fixing one end of flexure 16 on the bottom plate 13 and fixing another end on the lens carrier 12 (FIGS. 2, 3). In this way, flexure 16 preloads the lens carrier 12 to ensure contact of the single sphere 31 with the rolling surfaces of its guide channel, formed by recess 29 and corner 30 of the bottom plate 13, which constrains the lens carrier 12 to move only along the focus adjusting direction (optical axis).

This flexure 16 is a thin element made of an elastic metallic material (e.g. steel, copper, bronze) which, as better shown in FIGS. 2 and 3, is substantially a flat spring formed by a series of meanders and provided with circular end portions that fit over corresponding pins formed on the lens carrier 12 and bottom plate 13 respectively. Generally speaking, flexure 16 improves the stability of the AF actuator and this is of particular relevance when the AF module is controlled via the position sensor formed by Hall sensor 20 and magnet 21. In fact, small lateral displacements of magnet 21 due to rotation of the lens carrier 12 around the optical axis may induce feedback errors, and the presence of flexure 16 prevents such rotational displacements and improves the AF performances.

In the rest condition the actuator is in the so-called infinity focus position and when the SMA wire 17 is heated by current passage it shortens and exerts a force onto the lens carrier 12 moving it upwards such that the lens is focused up to the so-called macro position (i.e. focusing on a nearby plane). When the current supply stops, the return spring 14 exerting a vertical return force opposing the SMA traction pushes back the lens carrier 12 to the infinity position. Infinity and macro represent the two AF extreme position and therefore correspond to the amount of adjustment that the AF actuator shall be capable to achieve.

A position sensor and readout, in this case exemplified by magnet 21 anchored to the lens carrier 12 and the Hall sensor 20 attached to PCB 19, are present to determine the correct equilibrium position during the AF actuator operation. The PCB 19 will provide current to the SMA wire 17 through terminals 18 for its activation via Joule effect according to the Hall sensor 20 readout.

The AF actuator according to the present invention is not restricted to a specific type of SMA wires, but any SMA wires activated by Joule effect may be usefully employed. Having said that, preferred is the use of SMA wires made with Ni—Ti alloys widely known in the field with the name of Nitinol, with diameters ranging from 10 µm to 50 µm and commercially available from a variety of sources, for examples the wires sold under the trade name Smartflex by SAES Getters S.p.A., of particular preference is the use of 25 μm wires.

With regards to the material of spheres 27, 31 there is no specific requirement apart from using a material with good surface roughness and hardness such as ceramic or metal, stainless steel being preferred in order to prevent the occurrence of rust particles which might jeopardize the image quality of the camera module. As to the number of spheres, each set contained in a slot 26 is made up of the same number of spheres with at least two spheres per set and there are at least three slots 26 whereby the minimum number of spheres 27 is six, i.e. only spheres 27A without smaller spheres 27B in this case, plus the opposite corner sphere 31.

With regards to the spheres diameter, for the larger spheres 27A the diameter is preferably approximately ⅓ of the height of the lens carrier 12, for the smaller spheres 27B the diameter is approximately 80–95% of the larger spheres diameter and for the single sphere 31 there is no specific limitation but it is advantageous to use the same size as the larger spheres 27A for unifying material selection. The cumulative height of the sphere set with respect to the diameter of the guide pin 15 is such that the ratio of the center-to-center distance between upper and lower spheres 27A with respect to the diameter of pin 15 is preferably greater than 1,2:1.

A variant envisions the use of a frontal protrusion 22 with an upper apex, the SMA wire 17 being held above it, terminals 18 being placed at a lower height and the return spring 14 being located between the lens carrier 12 and the bottom plate 13. In this case, in fact, the SMA wire 17 will exert a downward traction (the up-down direction being defined with respect to the lowest element of the actuator, i.e. the bottom plate 13) and the rest position corresponds to macro, while the fully activated position corresponds to infinity.

In another variant the sphere set is made up of spheres 27 having all the same diameter, e.g. three spheres 27A, and a circumferential recess is made in the middle portion of the guide pin 15 and/or of the construction cylinder CC on the lens carrier 12 (i.e. the rolling surfaces of slots 26) at a position in correspondence with the intermediate sphere 27A that replaces the smaller sphere 27B.

In still another variant, the two electric terminals 18 are located on two adjacent sides of the bottom plate 13 and the SMA wire 17 engages the apex of a corner protrusion that replaces the frontal protrusion 22.

Figure 7:
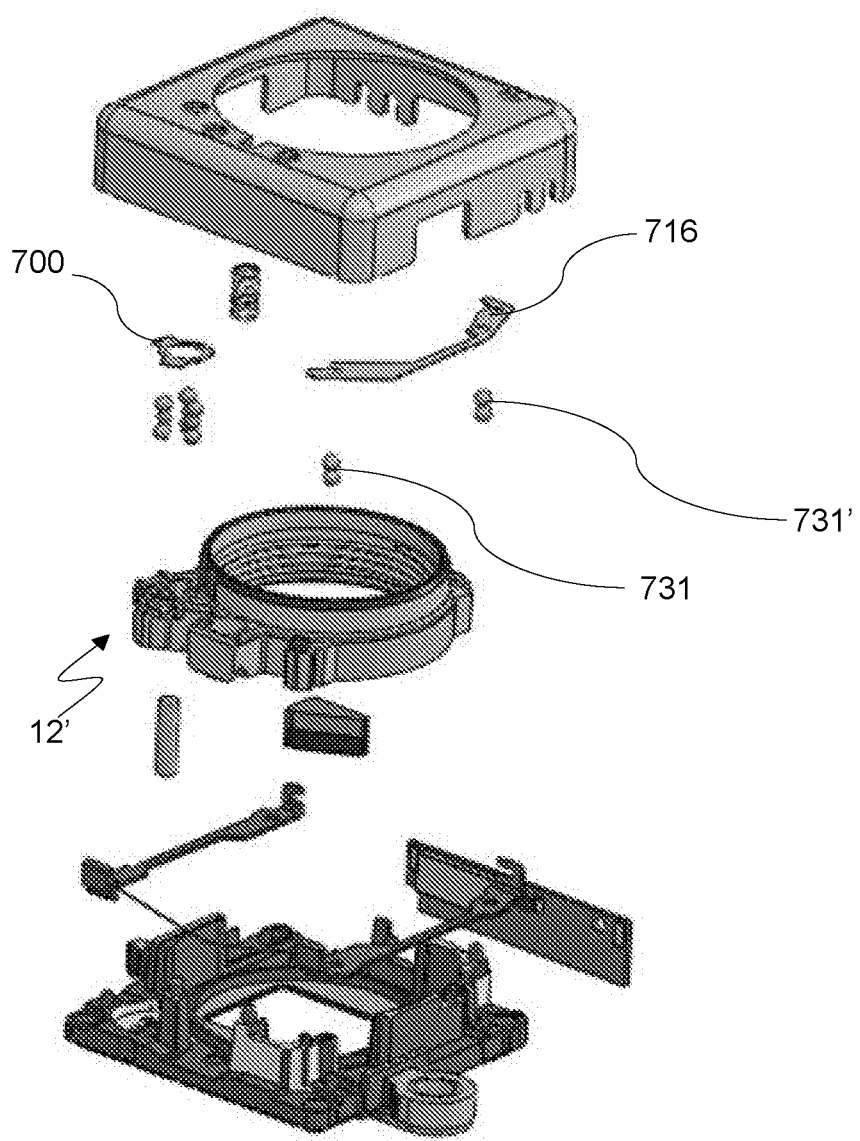
FIG. 7 is a vertically exploded top perspective view of the elements constituting an AF actuator according to an alternate embodiment of the present invention.
Figure 8:
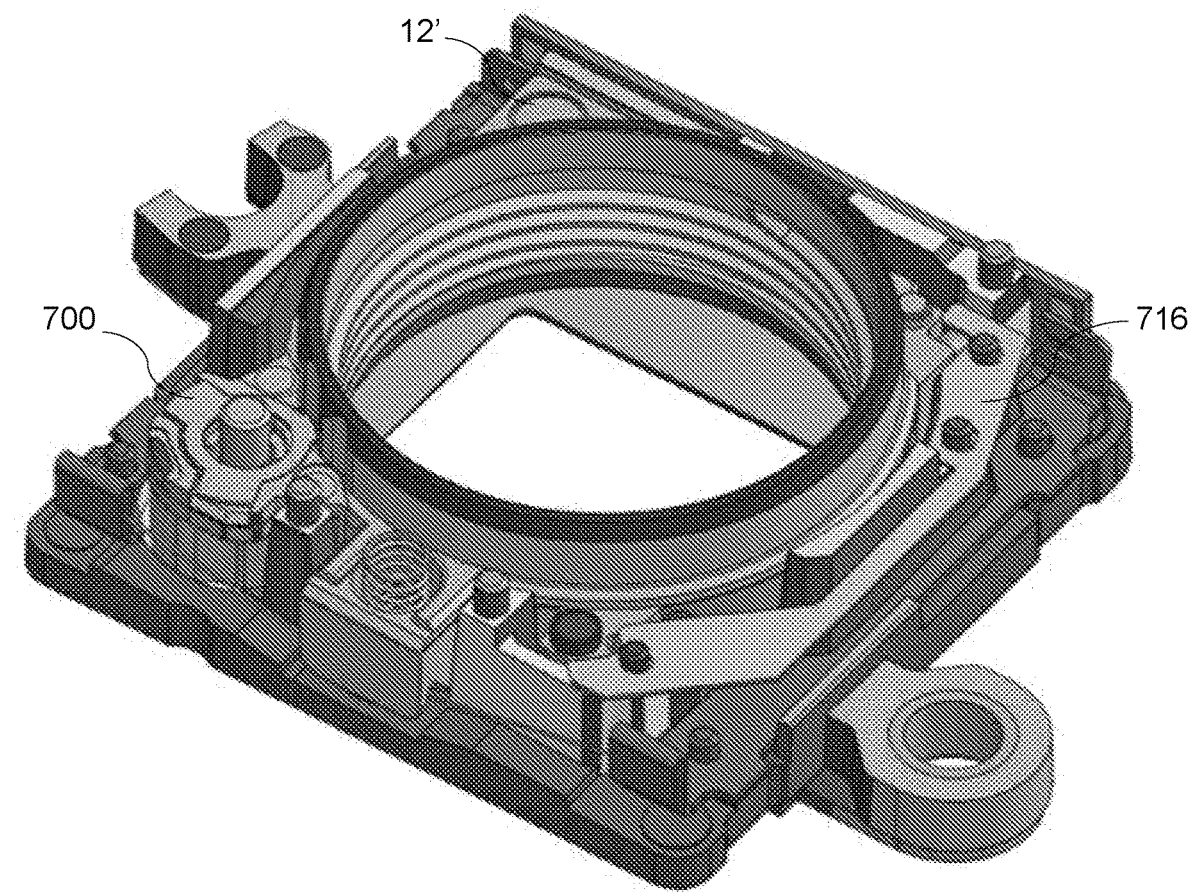
FIG. 8 is a top perspective view of the AF actuator of FIG. 7 in the assembled condition, without the shield can.
Figure 9:
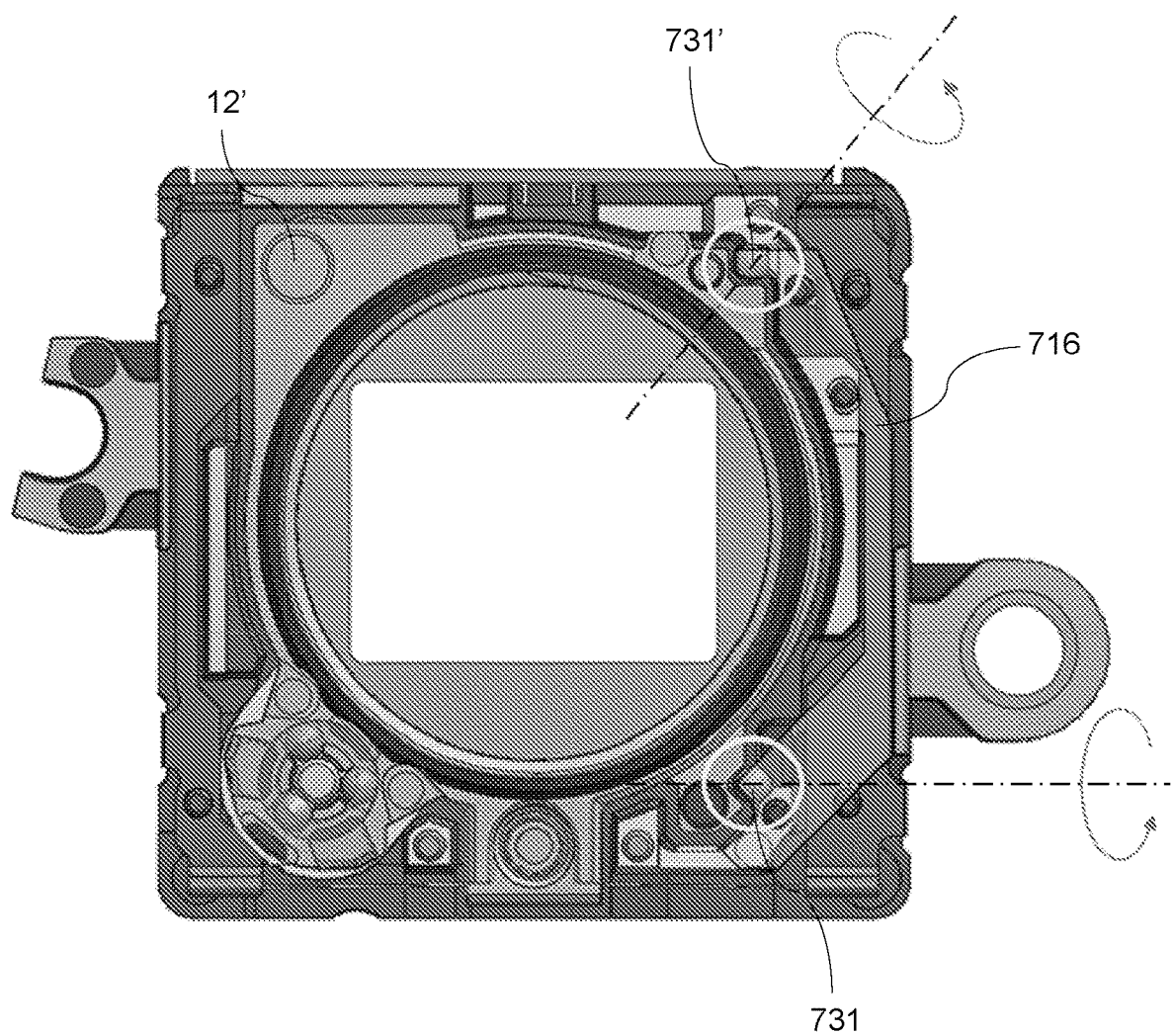
FIG. 9 is a top plan view of the AF actuator of FIG. 8 and with some elements depicted in transparency.

Another embodiment is shown in FIGS. 7-9, in which only different elements with respect to those already illustrated in FIGS. 1-3 have been indicated with numerals. In particular in this variant there is a retaining element 700 on top of the first set of spheres (i.e. elements 27A and 27B of FIG. 1). Element 700 is preferably a trilobate flat metallic sheet with a central hole whose diameter is larger but of comparable size with respect to the guide pin, i.e. the hole diameter is no more than 4 mm larger than the diameter of the guide pin.

Another difference with the first embodiment is given by the presence of two sets of additional spheres 731 and 731', each set containing at least two spheres, that replace flexure 16. Said spheres 731, 731' are located with respect to the guide pin at an adjacent corner and an opposite corner of a modified lens carrier 12', respectively, and they are kept in position by a sphere stopping structure, preferably a single structure 716 extending between the two sets of spheres.

The wall orientation of the lens carrier 12' is different between the two portions in contact with the two sets of spheres so as to prevent the rotation/tilting in different directions. More specifically, in the illustrated example, each set of spheres rests against a 90° recess formed symmetrically with respect to an axis connecting the guide pin to said set, whereby the two sets of spheres 731, 731' prevent the movements along two directions arranged at an angle of 45° to each other.

The invention claimed is:

1. A camera module autofocus actuator comprising:
   a bottom plate (13),
   a movable lens carrier (12) having a protrusion (22) with an apex (23) for lodging a shape-memory alloy (SMA) wire (17),
   a shield can (11),
   at least six spheres (27),
   two electric terminals (18),
   a return elastic element (14),
   anti-rotation means to prevent rotation of said lens carrier (12) around its optical axis during its movement,
   wherein in said actuator:
   the lens carrier (12) is slidably mounted between said shield can (11) and said bottom plate (13),
   said anti-rotation means are arranged between the lens carrier (12) and the bottom plate (13),
   said two electric terminals (18) are fixed onto the bottom plate (13),
   said SMA wire (17) is in contact with said lens carrier protrusion apex (23) and its extremities are locked to the two electric terminals (18) at a different height with respect to the protrusion apex (23), and
   said return elastic element (14) exerts a force on the lens carrier (12) opposing the force of the SMA wire (17) on the lens carrier (12),
   wherein the actuator further includes:
   a guide pin (15) mounted on the bottom plate (13) with its longitudinal axis parallel to the optical axis of the lens carrier (12) and having surface hardness comparable to that of said spheres (27), and
   at least three slots (26) formed in the lens carrier (12) each containing and holding at least two spheres (27), said slots (26) being formed symmetrically around said guide pin (15) and extending parallel thereto such that the spheres (27) contained in the slots (26) are always in contact with the guide pin (15), whereby the guide pin (15), slots (26) and spheres (27) form a linear bearing.

2. The camera module autofocus actuator according to claim 1, wherein the at least three slots (26) are formed in a first corner protrusion (25) of the lens carrier (12).

3. The camera module autofocus actuator according to claim 2, wherein the anti-rotation means are located at a position opposite to the guide pin (15) and include at least one sphere (31) and/or a flexure (16).

4. The camera module autofocus actuator according to claim 2, wherein the lens carrier (12) is provided with a second corner protrusion (28) in which an axial recess (29) forms with a corner (30) of the bottom plate (13) a guide channel that contains the anti-rotation sphere (31).

5. The camera module autofocus actuator according to claim 2, wherein the anti-rotation means consist of two sets of additional spheres (731, 731'), each set containing at least two spheres and being located with respect to the guide pin (15) at an adjacent corner and an opposite corner of a modified lens carrier (12'), respectively, and in that said spheres (731, 731') are kept in position by a sphere stopping structure.

6. The camera module autofocus actuator according to claim 2, wherein the modified lens carrier (12') is provided with a different wall orientation between the two portions thereof in contact with the two sets of spheres (731, 731') so as to prevent the rotation/tilting in different directions.

7. The camera module autofocus actuator according to claim 1, wherein the anti-rotation means are located at a position opposite to the guide pin (15) and include at least one sphere (31) and/or a flexure (16).

8. The camera module autofocus actuator according to claim 7, wherein the lens carrier (12) is provided with a second corner protrusion (28) in which an axial recess (29) forms with a corner (30) of the bottom plate (13) a guide channel that contains the anti-rotation sphere (31).

9. The camera module autofocus actuator according to claim 8, wherein the flexure (16) is a flat metallic spring formed by a series of meanders and provided with circular end portions, the flexure (16) being arranged in a plane substantially perpendicular to the optical axis.

10. The camera module autofocus actuator according to claim 7, wherein the flexure (16) is a flat metallic spring formed by a series of meanders and provided with circular end portions, the flexure (16) being arranged in a plane substantially perpendicular to the optical axis.

11. The camera module autofocus actuator according to claim 7, wherein the lens carrier (12) is provided with a second corner protrusion (28) in which an axial recess (29) forms with a corner (30) of the bottom plate (13) a guide channel that contains the anti-rotation sphere (31).

12. The camera module autofocus actuator according to claim 1, wherein the anti-rotation means consist of two sets of additional spheres (731, 731'), each set containing at least two spheres and being located with respect to the guide pin (15) at an adjacent corner and an opposite corner of a modified lens carrier (12'), respectively, and in that said spheres (731, 731') are kept in position by a sphere stopping structure.

13. The camera module autofocus actuator according to claim 12, wherein the modified lens carrier (12') is provided with a different wall orientation between the two portions thereof in contact with the two sets of spheres (731, 731') so as to prevent the rotation/tilting in different directions, preferably along two directions arranged at an angle of 45° to each other.

14. The camera module autofocus actuator according to claim 12, wherein the sphere stopping structure is a single structure (716) extending between the two sets of spheres.

15. The camera module autofocus actuator according to claim 1, wherein each set of spheres (27) contained in a slot (26) includes two larger spheres (27A) separated by a smaller sphere (27B).

16. The camera module autofocus actuator according to claim 15, wherein the larger spheres (27A) have a diameter that is approximately equal to ⅓ of the height of the lens carrier (12).

17. The camera module autofocus actuator according to claim 15, wherein the smaller sphere (27B) has a diameter that is approximately equal to 80~95% of the diameter of the larger spheres (27A).

18. The camera module autofocus actuator according to claim 1, wherein each set of spheres (27) contained in a slot (26) includes three identical spheres (27) and a circumferential recess is made in the middle portion of the guide pin (15) and/or of the slots (26) at a position in correspondence with the intermediate sphere (27).

19. The camera module autofocus actuator according to claim 1, wherein the cumulative height of each set of spheres (27) contained in a slot (26) is such that the ratio of the center-to-center distance between the upper and lower spheres (27) with respect to the diameter of the guide pin (15) is greater than 1.2:1.

20. The camera module autofocus actuator according to claim 1, wherein the protrusion (22) engaged by the SMA wire (17) has a recess (24) which acts as a seat for the return elastic element (14).

21. The camera module autofocus actuator according to claim 1, wherein it further includes a magnet (21) fixed onto the movable lens carrier (12) and a Hall sensor (20) fixed onto a printed circuit board (19) mounted on the bottom plate (13).

* * * * *